United States Patent [19]

Suchowski

[11] Patent Number: 4,689,860
[45] Date of Patent: Sep. 1, 1987

[54] HOOK

[75] Inventor: Bernard Suchowski, Marlboro, N.J.

[73] Assignee: The Hartz Mountain Corporation, Harrison, N.J.

[21] Appl. No.: 866,388

[22] Filed: May 23, 1986

[51] Int. Cl.⁴ .............................................. A44B 13/02
[52] U.S. Cl. ...................................................... 24/239
[58] Field of Search .................. 24/238, 239, 374, 598, 24/599, 241 SL, 241 PS

[56] References Cited

U.S. PATENT DOCUMENTS

| | | | |
|---|---|---|---|
| 414,011 | 10/1889 | Breul | 24/239 |
| 505,286 | 9/1893 | Carnell | 24/239 |
| 759,806 | 5/1904 | Broga | 24/239 X |
| 1,847,165 | 3/1932 | Baxter | 24/239 |
| 1,847,166 | 3/1932 | Baxter | 24/239 |

Primary Examiner—Philip C. Kannan
Attorney, Agent, or Firm—Kuhn and Muller

[57] ABSTRACT

A snap hook having a folded and bent sheet metal body retaining the hook stem, the snap and a biasing spring is provided with a security member for preventing opening of the body.

2 Claims, 6 Drawing Figures

HOOK

FIELD OF THE INVENTION

This invention relates to hooks and is more particularly concerned with so-called "snap" hooks for securely but releasably attaching one member to another, e.g. for attaching a leash to a ring or similar attachment on an animal's collar.

DESCRIPTION OF RELATED ART

Snap hooks have been known for many years, e.g. for removably attaching a strap or chain to a ring, or rod or the like, and generally involve a hook portion having a stem and an arcuate end or hook and employ a spring-biased "snap" or piston which the spring urges toward the free end of the hook to close the gap between it and the body of the snap hook so as to enclose any member, e.g. a ring, held by the hook. The snap and the spring are generally encased in the body which is integral with or is separate from but encloses the hook stem. Such snap hooks are used for many purposes, e.g. attaching leashes to animal collars, for holding items on automobile roof racks, for back packs, luggage, and the like, as is well known.

The makers of snap hooks are, of course, concerned with the reliability and life of the hooks but they are also concerned with the cost of manufacture, for obvious reasons. In one known form, as mentioned, snap hooks are formed with the hook portion and the snap holding and spring-holding body as a single, integral unit, formed as by die-casting. This is a particularly expensive manner of construction and assembly and does not always have the desired strength. In order to overcome these disadvantages, it has been proposed to form the hook portion separately and to encase its stem, the spring, and the snap in a body formed by bending and folding a piece of sheet metal into a case in which the three specified components are enclosed. This is a strong construction, and more economical to produce, but under certain circumstances of strain, the mating ends of the folded sheet metal may be forced apart.

It is, accordingly, an object of the present invention to provide a snap hook of improved non-integral construction.

It is another object of the present invention to provide a snap hook of the character indicated which has a body formed from a bent and folded metal sheet yet which is resistant to forcing apart of the body in service.

SUMMARY OF THE INVENTION

In accordance with the invention, an improved snap hook is provided wherein, in a construction of the type having a body formed from a bent and folded sheet metal blank for retention of the stem of the hook portion, the snap and the spring, means are provided for ensuring the integrity of the body at all times.

The foregoing and other objects and features of the invention will be readily apparent from the following detailed description of illustrative embodiments of the invention, taken in connection with the accompanying drawings.

DESCRIPTION OF THE PREFERRED EMBODIMENTS

Figure 1:
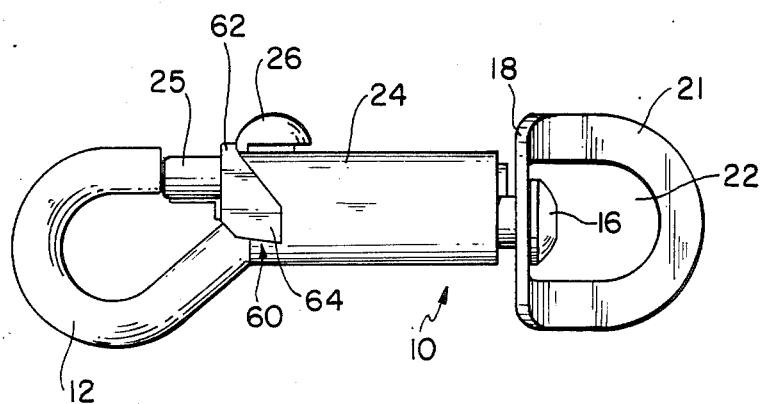
FIG. 1 is a side view of a typical snap hook embodying features of the present invention.
Figure 2:
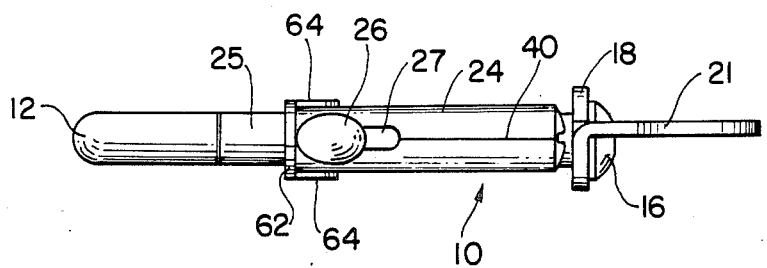
FIG. 2 is a top plan view of the snap hook shown in FIG. 1.
Figure 4:
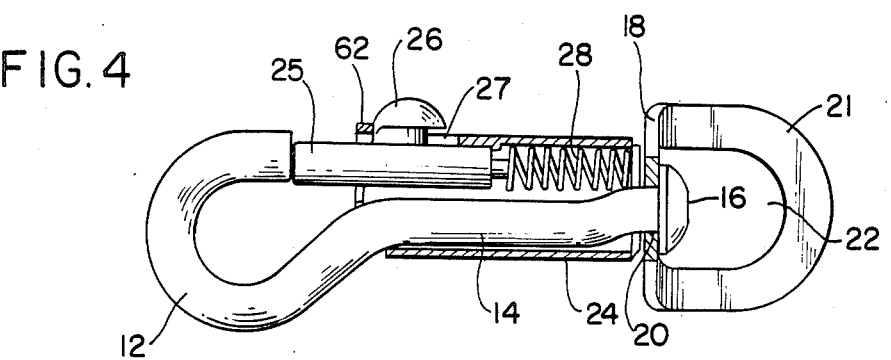
FIG. 4 is a side view of the snap hook, similar to FIG. 1, but is partly cut away and is partly in section to show details of construction.

Referring to the drawing, and particularly to FIGS. 1, 2 and 4, the reference numeral 10 designates generally a snap hook in accordance with a preferred embodiment of this invention. The hook 10 has a hook portion consisting of a hook 12 and a stem or shank 14 integrally formed therewith. The stem 14 has a button or stop 16 at its free end to hold rotatably an attachment member consisting of a body 18 which has been formed with an aperture 20, through which stem 14 extends on the inner side of button 16, and an extension or wing 20 formed with an opening 22 for receiving a strap or chain, or the like, which is to be attached to the snap hook 10.

Figure 3:
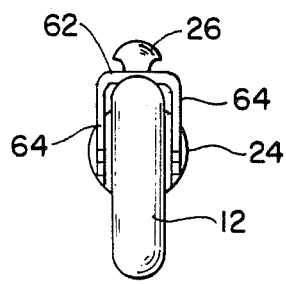
FIG. 3 is an end view of the snap hook shown in FIG. 1 as seen from the left-hand end of FIG. 1.
Figure 5:
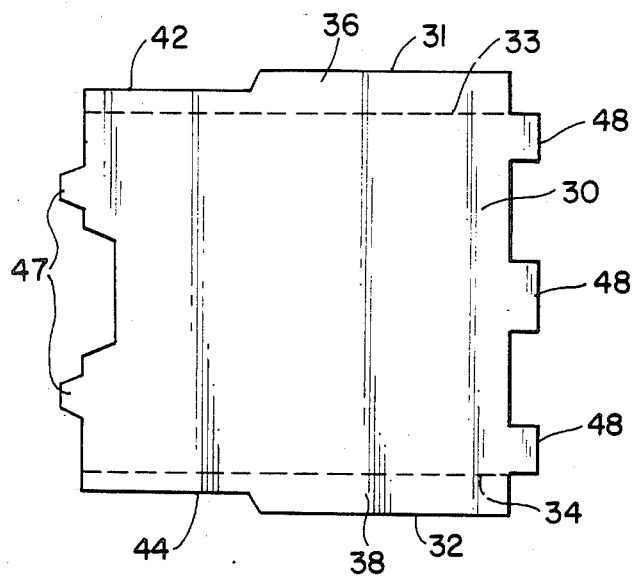
FIG. 5 is a plan view of a sheet metal "blank" from which the body or case of the snap hook shown in FIGS. 1–4 can be formed.

The main portion of stem 14 is encased within a body 24 through which stem 14 passes. Also found in body 24 is an elongated "snap" or piston 25, which is generally circular in cross-section, and has a button or knob 26 approximately at its axial center which extends through a slot 27 in body 24 for engagement by the user's finger. Behind snap 25 in body 24, and urging the snap outwardly, i.e. toward hook 12, is a coil spring 28, as can be clearly seen in FIG. 4. By reason of the action of spring 28, the gap between the free end of hook 12 and that of body 24 is normally bridged by the snap 25 but the snap can be retracted to open the gap for engaging or disengaging the snap hook merely by urging the snap 25 backwardly against the action of spring 28 by appropriately acting on knob 26 with one's finger. As seen in FIG. 5, a sheet metal "blank" 30 is given a shape such that it can be bent and folded so that its edges 31 and 32 essentially abut, the mating edges being seen in FIG. 2, and define the hollow generally-cylindrical body 24 shown in FIGS. 1–4. Inwardly of and parallel to sides 31 and 32, the blank 30 has fold lines 33 and 34, respectively, which define flaps 36 and 38 which are folded flat and mate along abutment line 40, as seen in FIGS. 2 and 3. The left-hand end of blank 30 as seen in FIG. 5 is cut away to define inwardly-disposed second edges, indicated at 42 and 44, so that, when edges 31 and 32 come together, edges 42 and 44 define the slot 27 at the forward or hook end of body 24. When blank 30 is folded, extensions 47 and 48 which are bent inwardly partially close the ends of body 24, while suitably accommodating hook stem 14 and snap 25.

The improved snap hook of this invention is provided by combining the aforementioned construction with means for closing the open forward end of slot 27 and holding in place the edges 42 and 44 of body 24 which define slot 27. In accordance with the most preferred form of the invention, there is provided a "saddle" 60 which, in the embodiment illustrated, has a generally U-shape and has a relatively narrow body 62 and relatively wide legs 64. The body 62 of the saddle 60 extends across slot 27 forwardly of knob 26, i.e. between knob 26 and the open end of body 24, and the two legs 64 overlie the sides of body 24. The saddle, thus positioned, is secured to body 24, as by spot welding. When the saddle 60 is thus combined with the snap hook construction described and illustrated, there is provided a total snap hook structure which is strong, secure, and relatively economical to manufacture.

Figure 6:
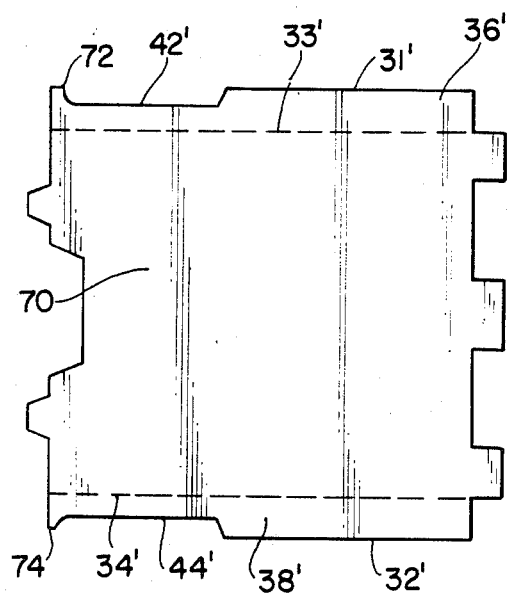
FIG. 6 is a plan view of a sheet metal blank similar to FIG. 5 but illustrating a blank for use in making another embodiment of the invention.

While the most preferred form of the snap hook construction of the invention has just been described, the inventive "concept" which underlies the invention can be embodied in other forms. For example, referring to FIG. 6, wherein like parts shown in FIG. 5 are given like reference numerals to which a prime has been added, there is shown a blank 70 stamped from sheet metal and adapted, like blank 30, to be bent and folded into a body 24, and having edges 31', 32', 42' and 44', fold lines 33' and 34' and flaps 36' and 38' and effectively provides a security member for the open end of slot 27. Unlike blank 30, however, blank 70 is formed with ears 72 and 74 at the ends of edges 42' and 44', respectively. When blank 70 is bent and folded and flaps 36' and 38' are bent along fold lines 33' and 34' to form body 24, the ears 72 and 74 essentially abut and are secured together, as by spot welding, and serve not only to close the open end of slot 27, but limit outward movement of knob 26, and thus of snap 25, and otherwise perform the functions of the saddle 60 of the most preferred embodiment previously described.

While two highly-effective illustrative embodiments of the invention have been described and illustrated, it will be apparent to those skilled in the art that various changes and modifications may be made in these embodiments and that other embodiments may be provided, without departing from the invention as defined in the appended claims. It is intended, therefore, that all matter contained in the foregoing description and in the drawing shall be interpreted as illustrative only and not as limitative of the invention.

What is claimed is:

1. A snap hook comprising a hook portion having a hook with a free end and having an elongated stem, a body formed from a bent and folded metal sheet enclosing said stem, said body having sides and having opposed edges defining a slot at its top having an open end facing said hook end, a snap movable in said body into and out of engagement with the free end of said hook, said snap having a finger actuatable projection extending through said slot, spring means biasing said snap toward said hook end, and means connecting the edges of said slot at said slot open end and to prevent expansion of said slot which means comprises a U-shaped saddle having a body extending transversely of said slot at its open end and having legs overlying said sides of said body, said saddle being secured to said body.

2. In a snap hook comprising a hook portion having a hook with a free end and having an elongated stem; a body enclosing said stem, said body having sides and having opposed edges defining a slot at its top with an open end facing said hook end; a snap movable in said body into and out of engagement with the free end of said hook, said snap having a finger activatable projection extending through said slot and spring means biasing said snap toward said hook end; wherein said snap hook includes means connecting the edges of said slot which comprises a U-shaped saddle having a body extending transversely of said slot at its open end and having legs overlying said sides of said body, said saddle being secured to said body; and the end of said elongated stem opposite said hook end including means to rotable hold an attachment member.

* * * * *